(12) United States Patent
Levin

(10) Patent No.: US 7,657,968 B2
(45) Date of Patent: Feb. 9, 2010

(54) WALKER WHEEL INTERFACE

(76) Inventor: Elaine Levin, 18666 E. Cavendish Dr., Castro Valley, CA (US) 94552

( * ) Notice: Subject to any disclaimer, the term of this patent is extended or adjusted under 35 U.S.C. 154(b) by 163 days.

(21) Appl. No.: 11/349,531

(22) Filed: Feb. 7, 2006

(65) Prior Publication Data

US 2006/0288525 A1  Dec. 28, 2006

Related U.S. Application Data

(60) Provisional application No. 60/681,365, filed on May 16, 2005.

(51) Int. Cl.
*A47B 91/00* (2006.01)
(52) U.S. Cl. .................. 16/44; 280/87.021; 280/87.051
(58) Field of Classification Search .................. 16/35 D, 16/44; 248/188.2; 280/47.12, 47.15, 47.16, 280/47.22, 42, 87.051, 87.021, 87.041, 87.01, 280/87.05, 639, 647–650; 5/510
See application file for complete search history.

(56) References Cited

U.S. PATENT DOCUMENTS

| | | | | |
|---|---|---|---|---|
| 1,788,391 | A * | 1/1931 | Green | 16/44 |
| 2,042,525 | A * | 6/1936 | Herold | 16/44 |
| 3,337,230 | A * | 8/1967 | Golding | 280/87.03 |
| 4,384,713 | A * | 5/1983 | Deutsch et al. | 482/68 |
| 4,572,533 | A * | 2/1986 | Ellis et al. | 280/250.1 |
| 4,799,700 | A * | 1/1989 | Knoedler et al. | 280/87.051 |
| 5,172,715 | A * | 12/1992 | Webb | 135/67 |
| 5,816,593 | A * | 10/1998 | Che | 280/87.041 |
| 6,318,392 | B1 * | 11/2001 | Chen | 135/67 |
| 6,834,872 | B2 * | 12/2004 | Chen | 280/87.021 |
| 2004/0107534 | A1 * | 6/2004 | Hsiao | 16/44 |

* cited by examiner

*Primary Examiner*—Chuck Y. Mah
(74) *Attorney, Agent, or Firm*—Jill L. Robinson

(57) ABSTRACT

An improved wheel interface for walkers that includes a spring interface connection between the frame of the walker and the wheel assembly. The walker is able to better absorb shocks that occur when encountering an obstacle such as a curb, allowing the user to avoid the necessity of allowing the walker to fall or to risk falling himself.

6 Claims, 4 Drawing Sheets

WALKER WHEEL INTERFACE

CROSS-REFERENCE TO RELATED APPLICATIONS

This is a continuation-in-part of U.S. provisional application No. 60/681,365 filed May 16, 2005.

TECHNICAL FIELD

This invention relates generally to wheel interfaces for walker devices used for balance, stability and support.

BACKGROUND OF THE INVENTION

Older and disabled persons often require the additional balance, stability and support offered by a walker. Walkers of various designs are well-known in the art; however, a standard walker does not "give" when it hits a bump in the sidewalk or the curb. As a result, the walker can become stuck, requiring the user to nudge the walker over the impediment with his knee. Additionally, this lack of "give" makes it more likely that that walker will become off-balance causing the walker to fall forward and collapse. The user may then have to either let go of the walker and/or risk falling. It is therefore an object of this invention to provide an improved walker that allows for shocks caused by rough ground and impediments to be ameliorated.

SUMMARY OF THE INVENTION

The present invention is an improved walker wheel interface that incorporates a spring connection between the frame of the walker and the wheel assembly. The walker may be of any standard type used for support during walking.

The wheel assembly includes a wheel rotably attached to a wheel support, which may be of a conventional "U" shape. The wheel assembly is attached to one end of a support member, which is part of a support assembly. The support assembly comprises a means to attach the leg of the walker to the wheel assembly. A hollow member is adapted to receive the support member and be positioned above the wheel assembly when the walker is in an operable position. The support member extends from both ends of the hollow member. A spring is positioned over the support member, between the wheel assembly and the hollow member, and supports the hollow member. A stop means is attached to or integral with the top of the support member to prevent the hollow member from being removed. The leg of the walker is attached directly or indirectly to the hollow member, thus allowing the leg of the walker to be in operable connection with the spring.

As pressure is applied in an approximately downward direction on the leg of the walker, as might occur when the walker strikes an impediment and the user pushes forward on the handle or falls, the spring is compressed, absorbing some of the force of the resulting shock, and allowing the user to retain his balance.

DETAILED DESCRIPTION OF THE DRAWINGS

Figure 1:
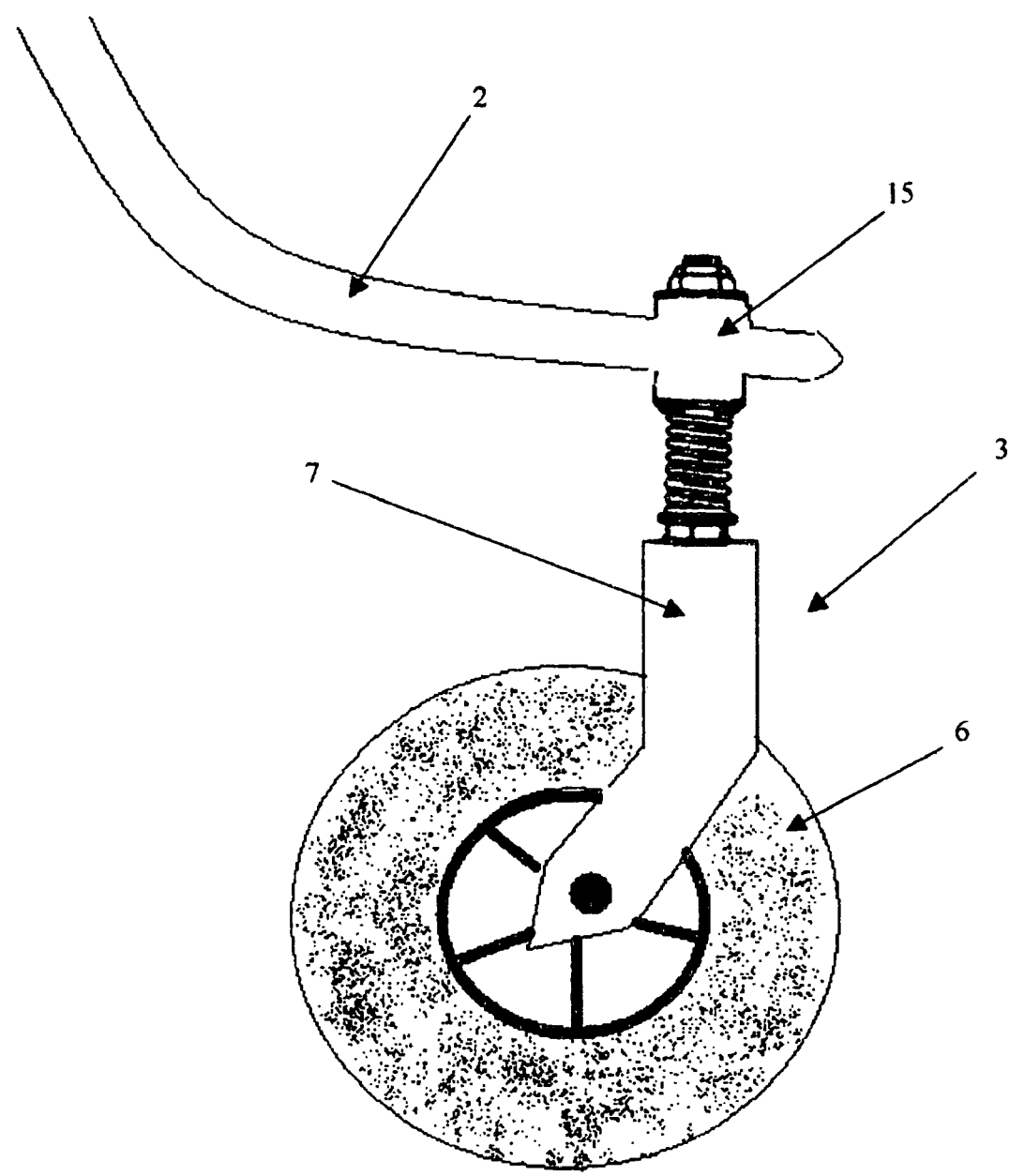
FIG. 1 shows a side view of a walker incorporating the invention.

FIG. 1 shows a side view of a walker incorporating the invention. It will be understood that the walker is an example only and that most standard walkers could be modified to incorporate the invention. Each side of walker generally comprises a handle (not shown) which is attached to a first leg member 2 that extends in an approximately downward direction and is attached to the front wheel assembly 3. It will be understood by those of ordinary skill in the art that the frame of the walker would also usually include a second leg member attached to the first member extending in an approximately downward direction and attached to a rear wheel assembly. A cross frame member 4 may be included between the two front leg members 2 to provide additional stability to the frame.

The invention comprises the mode of connecting the wheel assembly to the frame of the walker. Generally, an advantage will be gained if the invention is utilized to connect the front wheel assembly 3 to the first leg member 2. A walker would normally include an embodiment of the invention on each side of the front of the walker.

Figure 2:
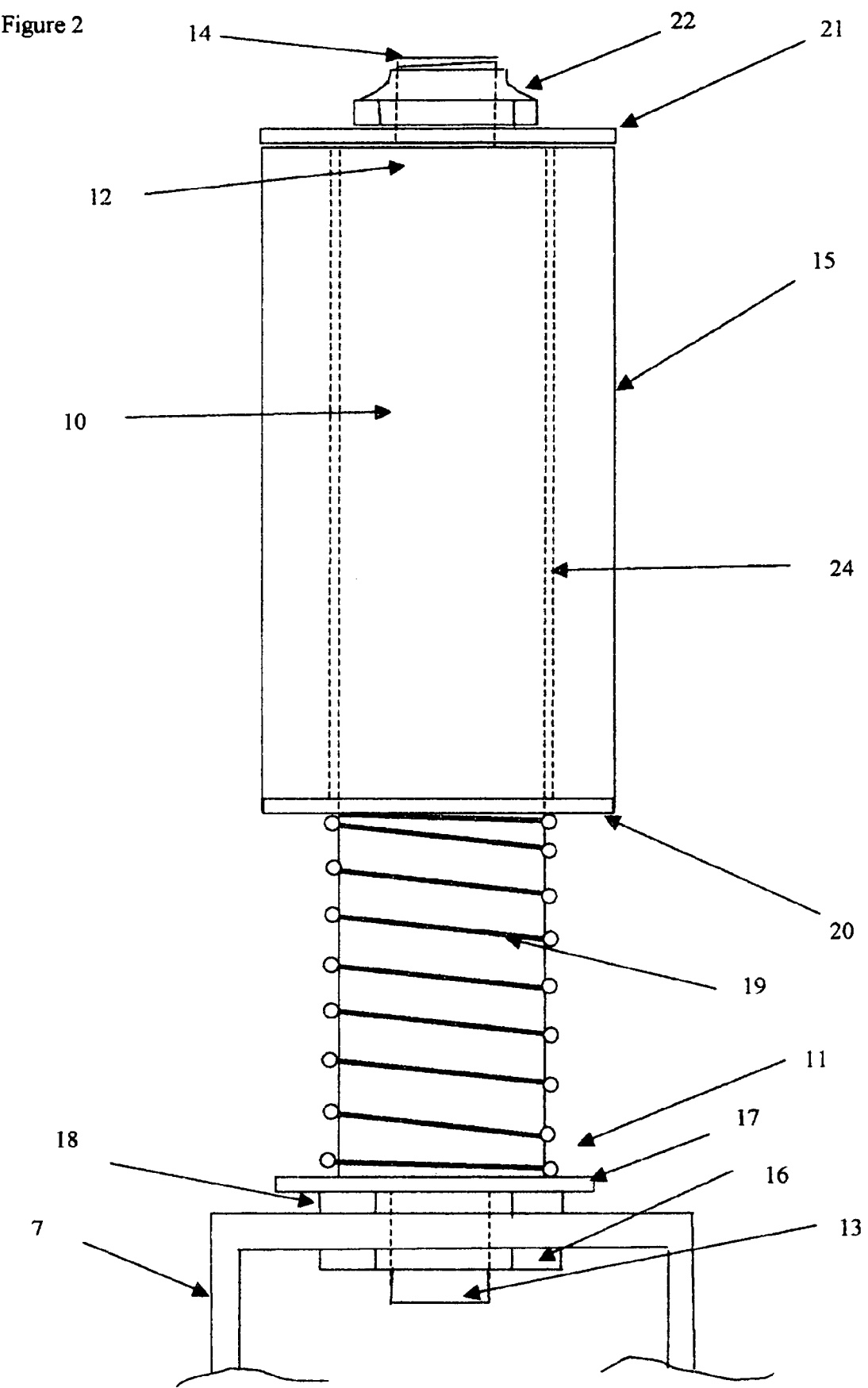
FIG. 2 shows a cutaway view of the invention in an uncompressed state.
Figure 3:
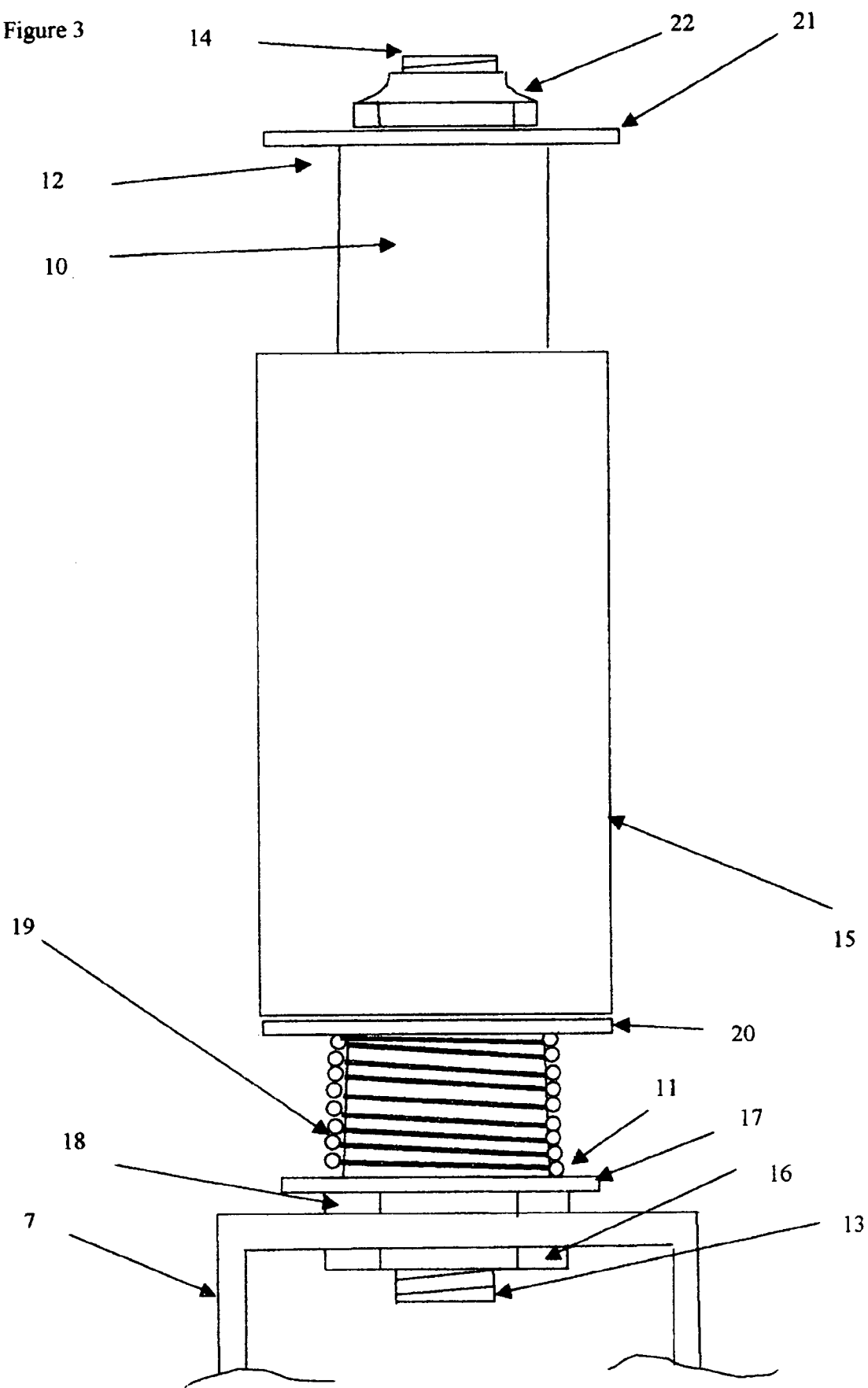
FIG. 3 shows a detailed view of the invention in a compressed state.
Figure 4:
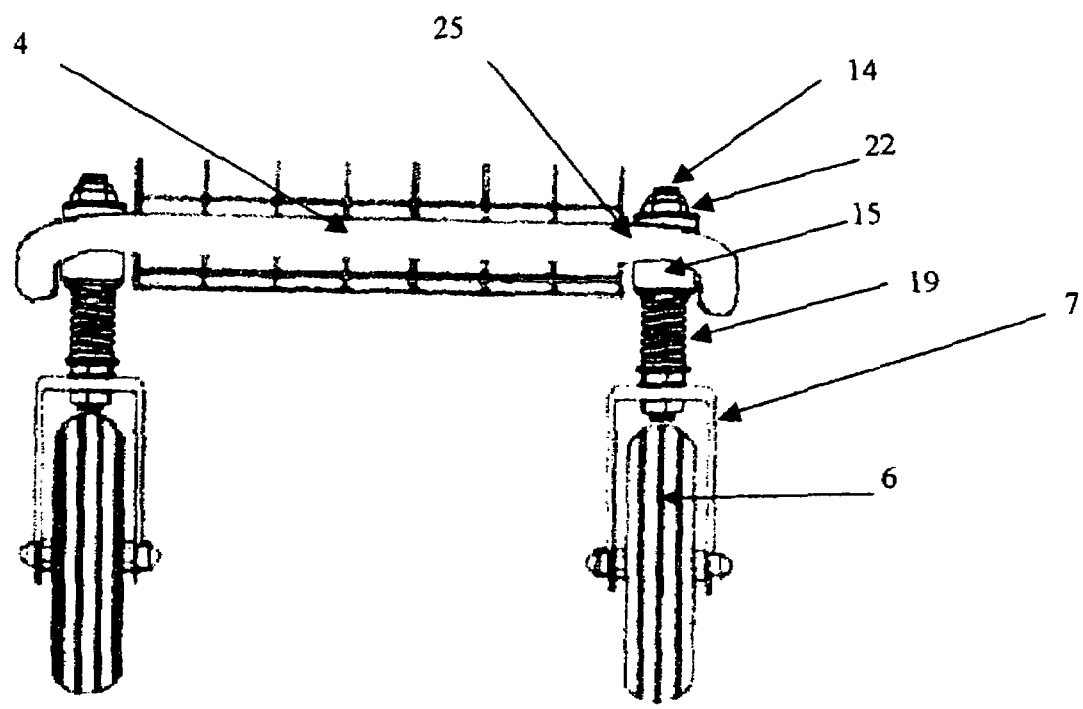
FIG. 4 shows a front view of a walker incorporating the invention.

The wheel assembly 3 includes a wheel 6 rotably attached to a wheel support 7, which may be of a conventional inverted "U" shape where it would be attached to the frame of the walker. With reference to FIGS. 2, 3 and 4, the wheel support 7 is attached to support member 10. In the Figures, each end of the support member 11, 12 comprises a threaded element 13, 14 adapted to receive a nut 22, 16, 18. A washer 17 may be placed on one threaded element 13 and held in place by a nut 18. The threaded element 13 may then be inserted through a hole (not shown) formed in the wheel support 7, and the wheel support 7 held in place by nut 16. It will be understood by those of ordinary skill in the art that other forms of attaching the wheel assembly 3 to the support member 10 are possible.

A hollow member 15 of an approximately tubular shape, with the internal perimeter 24 depending upon shape of the support member 10, is adapted to receive the support member 10 and be positioned above the wheel assembly 3 when the walker is in an operable position. In the embodiment shown, the support member 10 is long enough so that when inserted into the hollow member 15, the ends 11, 12 extend from each end of the hollow member to simplify the necessary attachments, although certain forms of stop means, further described below, and of means to attach the support member to the wheel assembly might utilize a design wherein the ends 11, 12 did not extend from the ends of the hollow member 15. For example, the wheel assembly might include an upwardly extending member adapted to fit into the hollow member and attach to the support member inside the hollow member by means of a threaded connection or the like.

A spring 19 is positioned between the wheel assembly and the hollow member 15, and may rest on or be attached to the washer 17, supporting the hollow member. A second washer 20 may be positioned over the central portion of the support member 10, between the spring and the hollow member. The spring 19 should be capable of supporting the weight of the walker elements to which it is connected in a substantially uncompressed position while the walker is not in use or is being pushed over a relatively smooth pavement. The spring 19 should preferably be selected so as to compress to a nearly fully compressed position when exposed to the greater of the expected force generated by a person of the expected user's weight falling against the walker or pushing the walker against an impediment.

A stop means is attached to or integral with the top of the leg and/or the hollow member to prevent the hollow member from being removed from the leg. In the embodiment shown the stop means is effected by an optional third washer 21 which may be placed over the threaded element 14 of the support member 10 and held in place with nut 22.

The first leg member 2 of the walker may be attached to the hollow member by welding or other conventional means. An indirect attachment using an additional frame member 25 may be utilized. Alternatively, the hollow member and the leg and/or frame member could be of unitary construction.

While the present invention has been shown and described with reference to the foregoing embodiment, it will be apparent to those skilled in the art that changes in form, connection, and detail may be made therein without departing from the spirit and scope of the invention as defined

What is claimed is:

1. An improvement in a walker for use by disabled persons comprising a frame supporting a handle, the frame including two rear legs, each rear leg fixedly attached to a rear wheel assembly, two front legs and a front wheel assembly, wherein the improvement comprises:

A front wheel interface for connecting the front legs to the front wheel assembly, comprising:
   - a support member having a first end and a second end;
   - a substantially tubular hollow member adapted to receive the support member;
   - a connection means for attaching the hollow member to a front leg of the walker;
   - a stop means for preventing the hollow member from being separated from the support member while the interface is in use;
   - an attachment means for attaching the second end of the support member to a front wheel assembly; and
   - a spring having a first end and a second end, wherein the first end is in operable connection with the hollow member and the second end is in operable connection to the front wheel assembly, whereby the hollow member is supported by the spring when the device is in use.

2. The improvement of claim 1 wherein the connection means comprises a frame member attached to the front leg.

3. The improvement of claim 2 wherein the hollow member is in a unitary construction with the frame member.

4. An improvement in a walker for use by disabled persons comprising a frame supporting a handle, the frame including a first rear leg fixedly attached to a first rear foot, a second rear leg fixedly attached to a second rear foot, two front legs, and a front wheel assembly, wherein the improvement comprises:

A front wheel interface for connecting the front legs to the front wheel assembly, comprising:
   - a support member having a first end and a second end;
   - a substantially tubular hollow member adapted to receive the support member;
   - a connection means for attaching the hollow member to a front leg of the walker;
   - a stop means for preventing the hollow member from being separated from the support member while the interface is in use;
   - an attachment means for attaching the second end of the support member to a front wheel assembly; and
   - a spring having a first end and a second end, wherein the first end is in operable connection with the hollow member and the second end is in operable connection to the front wheel assembly, whereby the hollow member is supported by the spring when the device is in use.

5. The improvement of claim 4 wherein the connection means comprises a frame member attached to the front leg.

6. The improvement of claim 5 wherein the hollow member is in a unitary construction with the frame member.

* * * * *